(No Model.)
J. B. WEST.
MACHINE FOR TRIMMING EDGINGS.
No. 331,015. Patented Nov. 24, 1885.
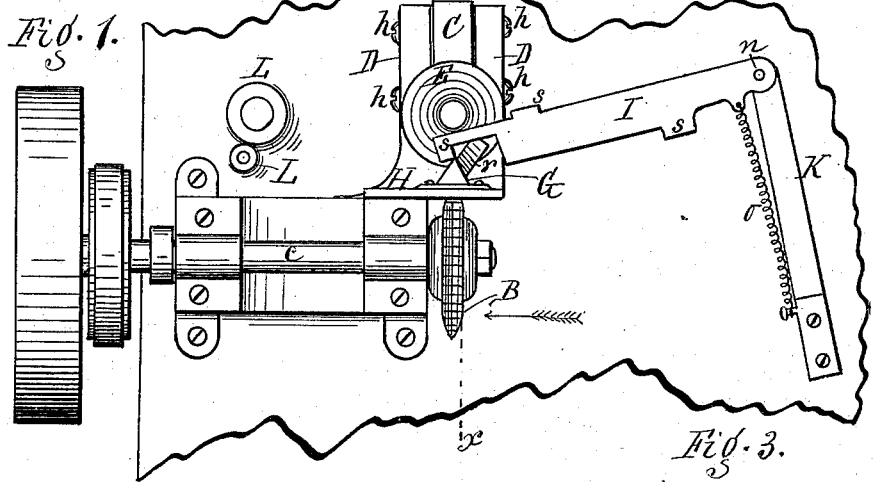
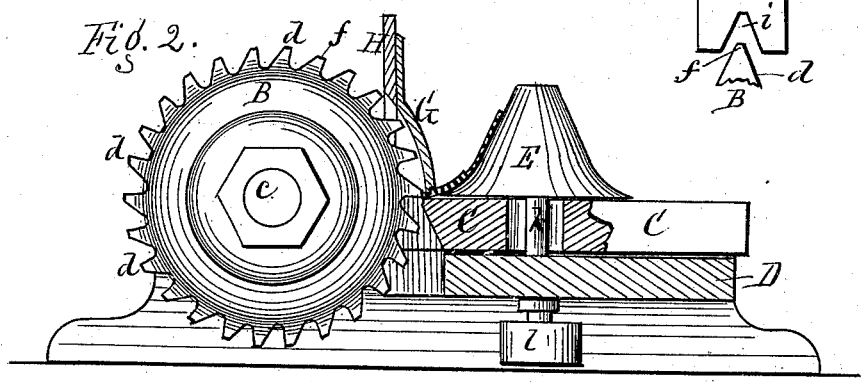
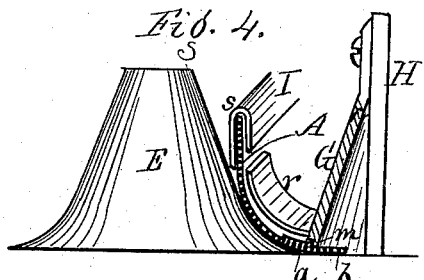
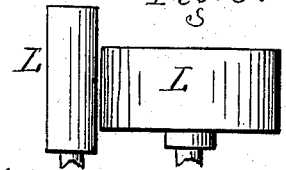
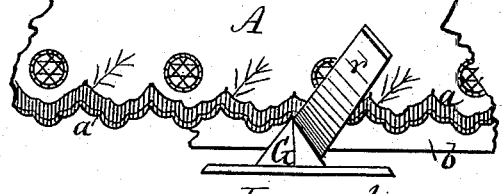
Attest.
Chas. F. Spencer
H. E. Shaffer
Inventor.
Jonathan B. West
pr R. F. Osgood
atty.

United States Patent Office.

JONATHAN B. WEST, OF ROCHESTER, NEW YORK.

MACHINE FOR TRIMMING EDGINGS.

SPECIFICATION forming part of Letters Patent No. 331,015, dated November 24, 1885.

Application filed August 24, 1881. Renewed February 29, 1884. Serial No. 122,504. (No model.)

*To all whom it may concern:*

Be it known that I, JONATHAN B. WEST, of Rochester, Monroe county, New York, have invented an Improved Machine for Trimming Edgings; and I do hereby declare that the following is a full, clear, and exact description of the same, reference being had to the accompanying drawings, in which—

Figure 1 is a plan of the machine. Fig. 2 is a vertical section on an enlarged scale in line $xx$ of Fig. 1. Fig. 3 is a diagram showing one tooth of the cutter and the end of the cutter bar or shear. Fig. 4 is an elevation of the guide, the gage, and their connections, looking on the opposite side from that shown in Fig. 2. Fig. 5 is an elevation of the feed-rollers. Fig. 6 is a bottom view of the gage. Fig. 7 is a diagram showing a plan of a section of the edging and the gage in position for guiding and holding the same in trimming the edging. Fig. 8 is a detail view showing the gage G in section.

My improvement relates to a machine for trimming off the blank edge on what are known as "Hamburg edgings," and is applicable for trimming any edgings where a raised figure is embroidered or worked on the fabric.

The invention consists in the combination and arrangement of parts hereinafter more fully described and claimed.

The edging consists of a plain strip of fabric, A, Fig. 7, on which is worked a figure, $a$, which forms a small ridge standing up above the surface of the cloth. Below the figure is a plain blank edge, $b$, which has to be trimmed or cut off, and this is usually done by scissors and by hand, which is a very slow and tedious process.

In the drawings, B represents a cutter mounted on a shaft, $c$, and receiving motion in any desired manner. On its periphery is a series of teeth, $d$ $d$, V-shaped in cross-section, except at the center, the points of which have a small thickness, $f$. The teeth incline forward in the direction of motion, as shown in Fig. 2.

C is a cutter-bar or shear-bed, consisting of a straight bar resting in a frame, D, and adjustable forward and backward, being fixed in any position by set-screws $h$ $h$ passing through the side of the frame. In the inner end of this bar is a V-shaped notch, $i$, of the same shape as the outline of the cutter-tooth, and the latter in passing through the notch fits it accurately at all points to produce a perfect cut.

E is a guide of conical form set vertically a little distance in advance of the cutter, its bottom resting closely down on top of the bar. It is attached to a shaft, $k$, and receives rotary motion by means of a pulley, $l$, or a suitable gear.

G is a gage standing in front of the cutter and between it and the guide. This gage is of V form in cross-section, the point standing forward in the direction of the guide, and it is attached to a face-plate, H, or other part which will give a substantial support. The cutter runs closely in a groove formed in the rear of the gage, as shown in Fig. 2. The lower end of the gage rests just far enough above the bed over which it rests to allow the thin blank edge $b$ of the embroidery to pass freely under it. In front of the lower edge of the gage is a small rib or shoulder, $m$, against which the raised embroidered ridge $a$ of the embroidery runs, and which prevents the ridge from passing under. The rib $m$ therefore forms the gage proper. The gage is attached by screws or otherwise, so that it may be raised or lowered to adjust it properly.

I is an arm forming a holder, pivoted at $n$ at its outer end to a suitable support, K. The inner end of the holder rests on the inner side of the guide E and stands substantially on the same incline. A small spiral spring, $o$, is attached to the rear end of the holder to draw the same inward; or, if desired, small weights may be applied on top of the holder, which will cause it to fall inward, owing to the inclined position in which the holder stands. The holder is provided with suitable open loops or retainers, $s$ $s$, to hold the edges of the embroidery which is placed therein. On the bottom of the gage G is also attached a small arm, $r$, which projects outward and upward, as shown in Figs. 1 and 7. The embroidery is wound upon a reel or spool, and the loose end is passed under the holder, being held in place by the loops $s$ $s$, but the front or inner loop $s$ rests behind the upper edge of the strip, while the arm $r$ rests in front of or outside of the lower edge, and the weight of the holder thus forces the embroidery down to the gage and cutter, while the arm *r* guides the blank under the gage, as before described.

L L are two vertical feed-rollers, made of rubber or other suitable material, one or both of which receive rotary motion by any suitable means. The loose end of the embroidered strip passes between these rollers, and is by them drawn along to produce the necessary feed.

The operation is as follows: The embroidered strip is placed in the holder I, the loose end being fixed in the feed-rollers L L, and motion is imparted to the latter, which feeds the strip along. The strip is forced down by the holder, the blank edge *b* running under the bottom of the gage G and the raised ridge *a* running outside and against the rib *m*. As the strip progresses, the undulated figure follows the gage and the strip rises and falls. The teeth of the cutter passing through the V-shaped notch *i* of the shear, the blank edge *b* is cut off close up to the raised figure, there being a narrow edge of the surplus fabric of uniform width left outside of the embroidery edge, resulting from the intervention of the gage between the outer extremities of the cutter-teeth and the said embroidery edge. The edges of the teeth are so inclined as to give a shearing cut, and thereby do perfect work.

The V or pointed form of the gage, the teeth of the cutter, and the slot or notch in the shear are essential in ordinary edgings to trim closely up into the pointed notches and angles of the embroidery, which are so acute that a more obtuse form would not reach them. Edgings which have simply rounded figures might be trimmed by a different form of the working parts. The guide E is also important to insure the proper vertical movement of the strip. The rotary movement of the guide corresponding with that of the feed-rollers causes the strip to rise and fall easily, which it could not readily do on a still surface.

Having thus described my invention, I claim—

1. In a machine for trimming edgings, the combination of a cutter, a shear-bed through which the cutter passes to cut the material, a gage for determining the position of the strip to be trimmed in relation to the cutter, a guide for sustaining the strip in proper position for moving toward and from the gage, and a holder to hold the strip to the gage and cutter, substantially as and for the purpose herein set forth.

2. The combination, with the cutter, the shear-bed, the gage, and the holder, of a conical guide, E, for the purpose herein specified.

3. The combination of a cutter the teeth of which are adapted to cut away a portion of the material at each cut, a shear-bed, a gage with an opening between the same and the shear-bed for receiving the fabric, and mechanism, as revolving rollers, for automatically feeding the material to the cutter, as herein set forth.

4. The combination of a circular serrated cutter, the teeth of which are adapted to cut away a portion of the material at each cut, means, as a belt and pulleys, for rotating the cutter, a shear-bed, mechanism, as revolving rollers, for feeding the material along in a direction transverse to the plane of the cutter, and a gage with an opening between it and the shear-bed for receiving the fabric, as herein set forth.

In witness whereof I have hereunto signed my name in the presence of two subscribing witnesses.

JONATHAN B. WEST.

Witnesses:
R. F. OSGOOD,
G. HENRY ROBERTS.